G. W. JACKSON.
TRACTOR.
APPLICATION FILED MAR. 18, 1918.
1,313,219.
Patented Aug. 12, 1919.
4 SHEETS—SHEET 3.
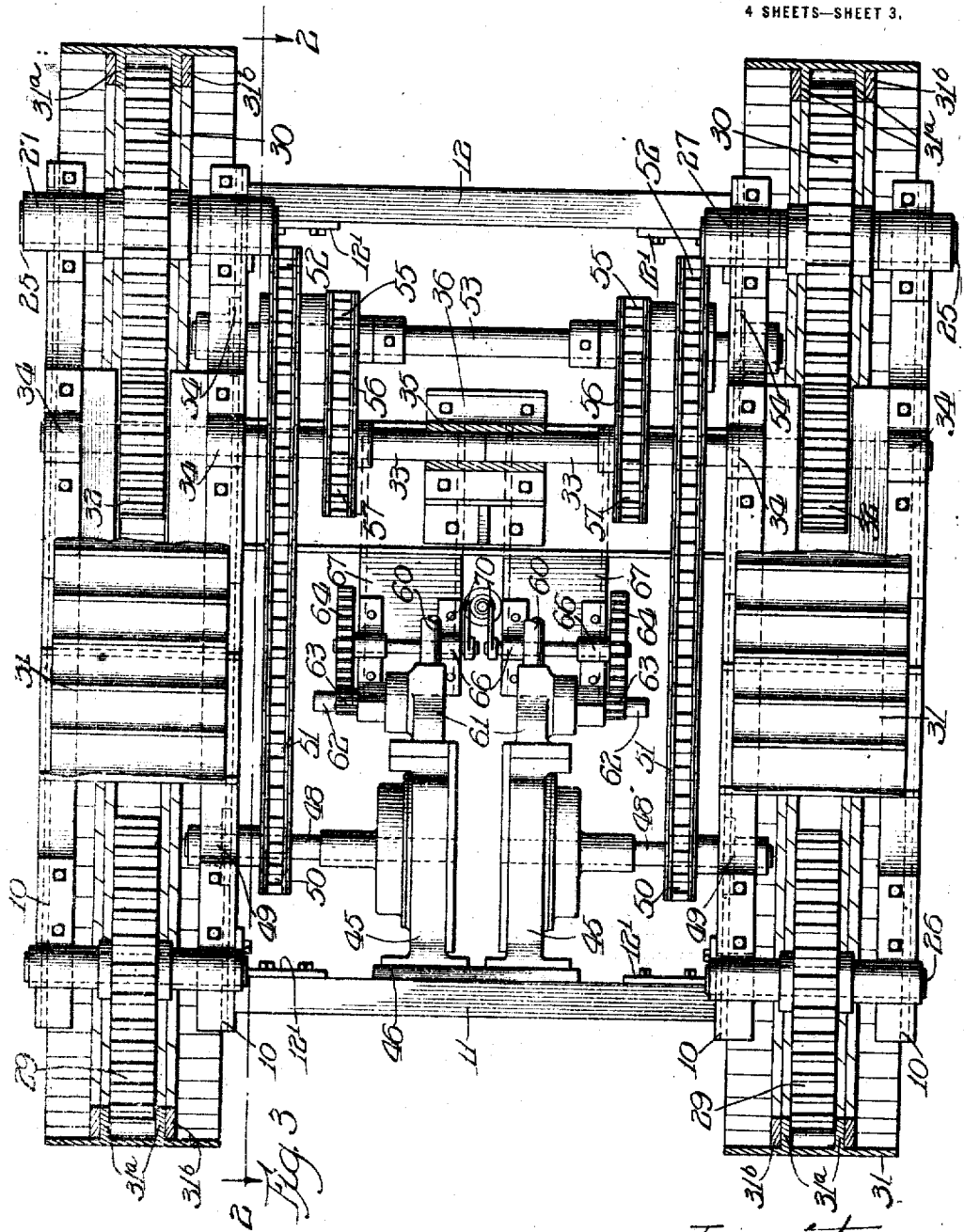

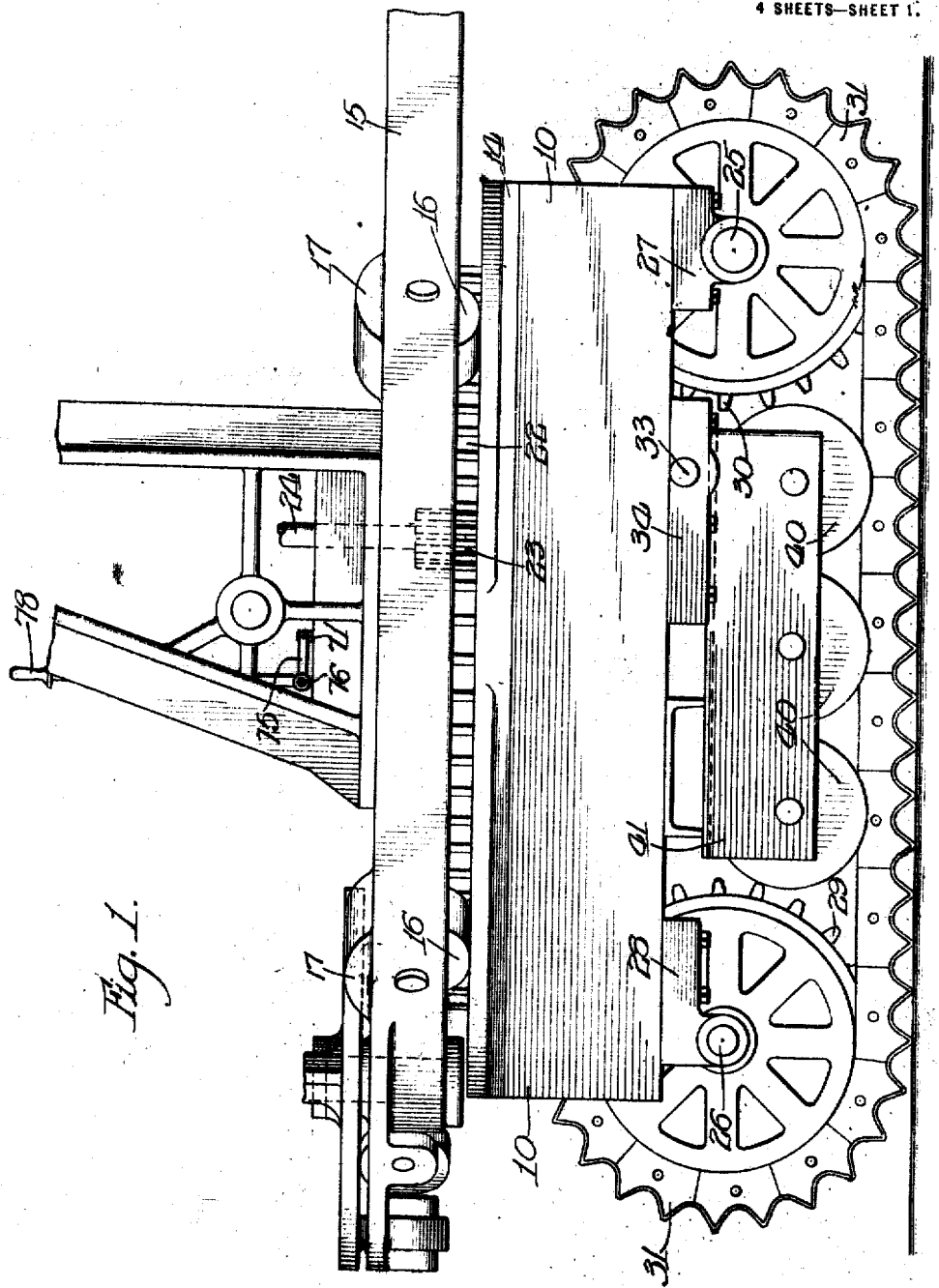

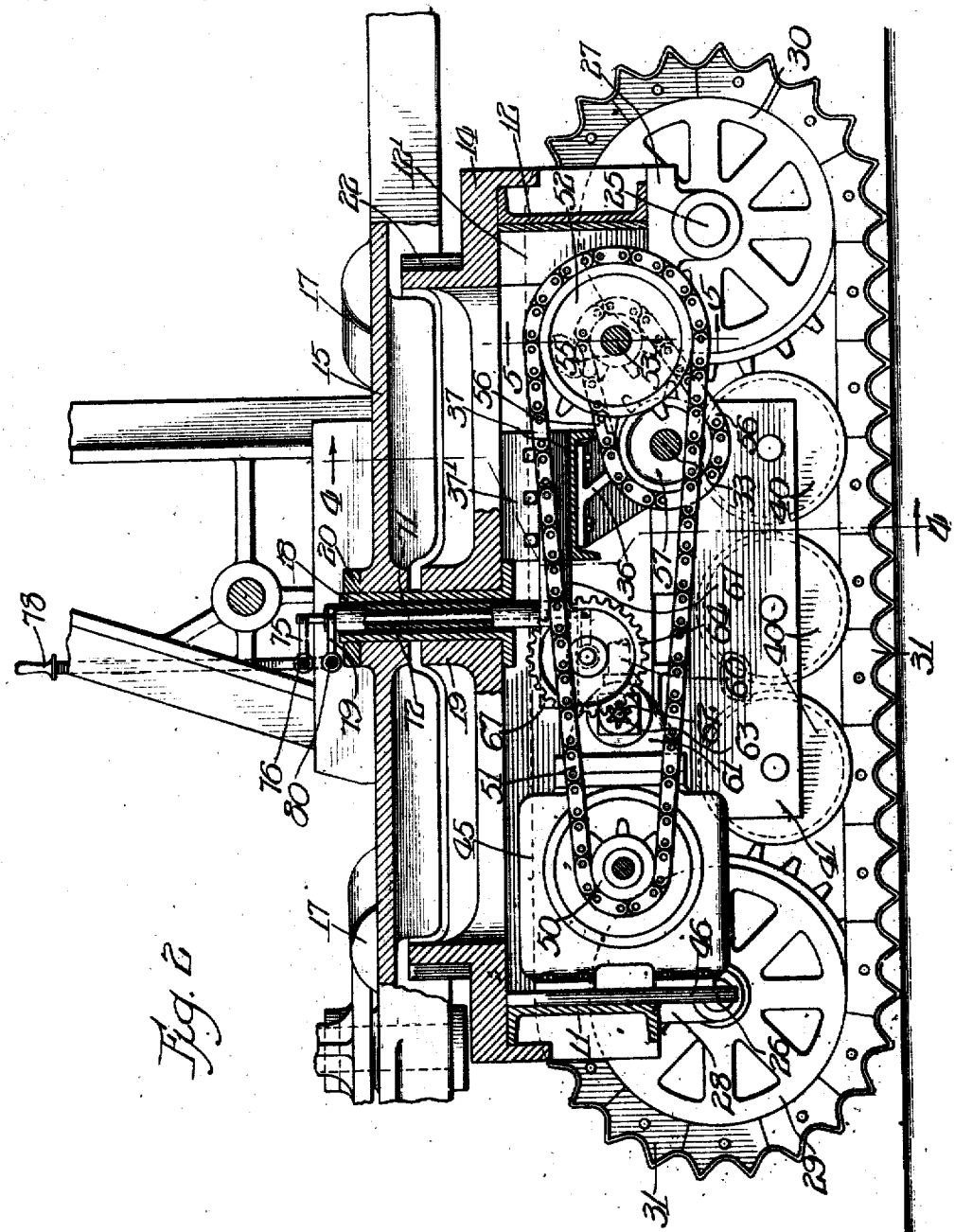

G. W. JACKSON.
TRACTOR.
APPLICATION FILED MAR. 18, 1918.
1,313,219.
Patented Aug. 12, 1919.
4 SHEETS—SHEET 4.
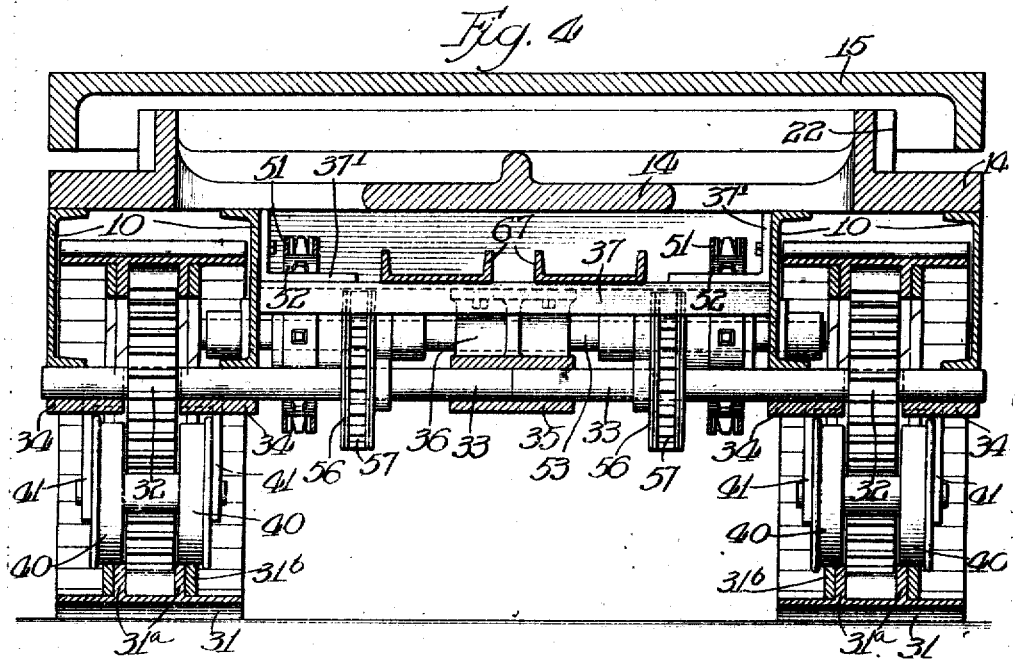
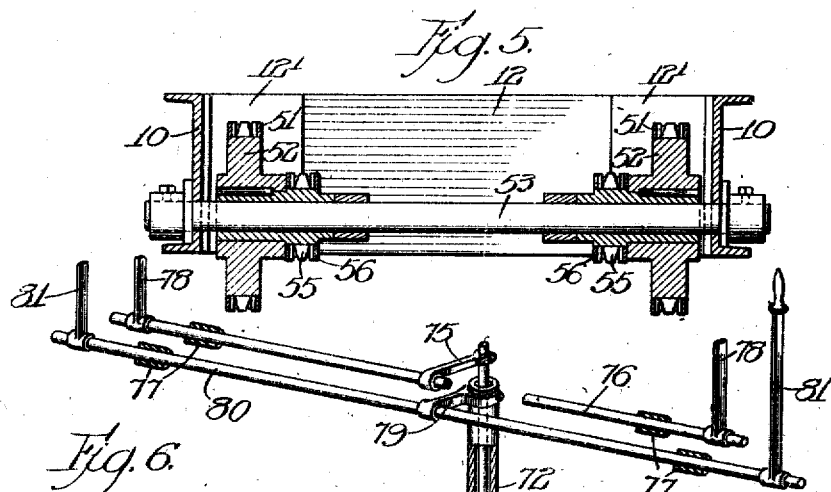
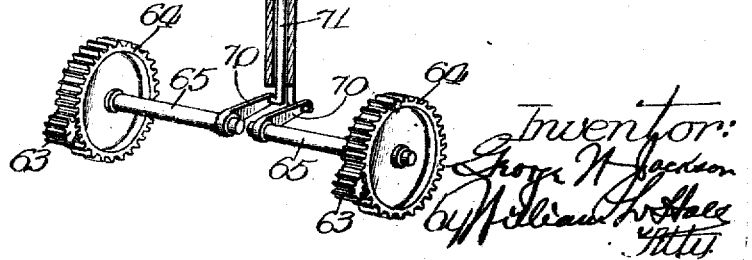

UNITED STATES PATENT OFFICE.

GEORGE W. JACKSON, OF CHICAGO, ILLINOIS, ASSIGNOR, BY MESNE ASSIGNMENTS, TO AMERICAN POWER SHOVEL COMPANY, OF MILWAUKEE, WISCONSIN, A CORPORATION OF WISCONSIN.

TRACTOR.

1,313,219.

Specification of Letters Patent.

Patented Aug. 12, 1919.

Application filed March 18, 1918. Serial No. 223,058.

*To all whom it may concern:*

Be it known that I, GEORGE W. JACKSON, a citizen of the United States, and a resident of Chicago, in the county of Cook and State of Illinois, have invented certain new and useful Improvements in Tractors; and I do hereby declare that the following is a full, clear, and exact description thereof, reference being had to the accompanying drawings, and to the characters of reference marked thereon, which form a part of this specification.

This invention relates to improvements in tractor drives and refers more particularly to the means for transmitting the driving power to the endless traction belt elements of the drive and to means for controlling the application of power thereto.

Among the purposes of the invention is to produce a form of tractor drive which is exceedingly rugged for heavy work, and which, at the same time, is capable of being manipulated to direct the course of the machine either forwardly or backwardly or for turning or steering purposes so that a relatively massive machine may be operated in close quarters.

Another object of the invention is to provide a mechanism adapted to tractor drive by which great power may be impressed on the machine in the direction of an attack to the work when adapted to a so-called loading machine, wherein an endless series of buckets are carried on a boom and the boom is directed to its work by tractive power applied through the traction belts. The mechanism herein shown is adapted to this latter type of machine, such, for instance, as is illustrated in my co-pending application for U. S. Letters Patent, Serial No. 195,213 filed on the 8th day of October, 1917.

Other objects of the invention are to improve, simplify, and render more compact mechanisms of this general character, and the invention consists in the combination and arrangement of the parts shown in the drawings and described in the specification, and is pointed out in the appended claims.

As shown in the drawings,—

Figure 1 is a side elevation of a tractor mechanism embodying my invention showing a portion of a loading machine to which the mechanism is adapted.

Fig. 2 is a section on the line 2—2 of Fig. 3.

Fig. 3 is a partial bottom view and partial horizontal section of the mechanism.

Figs. 4 and 5 are sections taken on the lines 4—4 and 5—5 of Fig. 2.

Fig. 6 is a perspective detail illustrating the motor control.

As shown in the drawings, the frame of the machine comprises two pairs of longitudinal beams 10, 10, of channel cross section as shown, transverse beams 11, 12 that are joined at their ends to the inner longitudinal beams, and a cast metal bed plate 14 of a dimension to extend from end to end and from side to side of the frame, as best shown in Figs. 2 and 4. Said bed plate is bolted or otherwise secured to the longitudinal and transverse beams and the beams are secured at their ends to each other in a suitable way as by the angle fittings 12'. 15 designates a cast metal turntable which is supported on the bed plate 14 to swing about an axis located centrally of the bed plate. The turntable is supported on the bed plat through the medium of a plurality of rollers 16 and the turntable is preferably shaped to form casings or housings 17 to cover said rollers.

The turntable rotates about an axis consisting as herein shown of a hollow shaft 18 that is seated in and extends upwardly through a boss 19 located centrally of the bed plate, said shaft being flanged at its lower end and being held in place by a washer 20 which surrounds it above the turntable.

The turntable is rotated on the bed plate through the medium of a circular rack 22 that is formed on an upstanding flange on the upper face of the bed plate and a pinion 23 that is mounted on a shaft 24 which has bearing in and extends through the turntable. The shaft may be connected with any suitable source of power, such, for instance, as shown in my aforesaid application, Serial Number 195,213.

25, 26 designates front and rear stub shafts that are mounted in suitable bearings 27, 28, depending from and attached to the side beams 10. Said shafts carry sprocket wheels 29, 30, the wheels at each side of the mechanism being located between the beams 10. Said sprocket wheels carry a series of articulated tractor blocks or sections 31 of any suitable form and shaped on their inner sides to mesh with the sprocket wheels.

They constitute the traction belt elements of the drive mechanism. Said traction sections or elements are formed with lugs 31ª that are connected to jointed links 31ᵇ to constitute the endless traction belt elements. The lugs 31ª constitute also guides for the sprocket wheels 29 and 30 to hold the traction belt elements in place. Those portions of the traction belt elements between the sprocket wheels 29 and 30 are pressed upon the roadway to give proper tractive effect thereto by means of pulleys 40, the shafts of which are carried by brackets 41 that are attached in any suitable manner to the frame.

The sprocket wheels 30 at one end of the machine mesh with pinions 32 which are fixed to and are driven by the sections of a transversely disposed divided shaft 33 that is mounted in bearings 34 carried by and depending from the side beams 10 of the frame and an intermediate bearing 35 which is carried by a bracket 36 which depends from and is bolted to a cross beam 37 which extends between and is secured at its ends to the side beams 10 in any suitable manner, as by angle fittings 37'.

The divided shaft is shown as driven by motors 45, 45 that are attached to and supported by pads 46 which are secured to the rear transverse frame beam 11. The driving connections between said motors and the divided shaft are made as follows:

The power shafts 48 of said motors, which are separate from each other, are supported at their outer ends in bearings 49 carried by the inner side beams 10 of each pair. Fixed to said shafts are sprockets pinions 50 that are connected by sprocket belts 51 to sprocket wheels 52 which are fixed to sleeves which carry the sprockets 55, as shown in Fig. 5, mounted on the opposite ends of a solid shaft 53 that is supported in suitable bearings 54 carried by the inner side beams 10. Said shaft 53 also carries sprockets 55 that are connected by sprocket belts 56 with sprocket wheels 57 that are severally fixed to the sections of the divided shaft 33. Through the sprocket belts and gears described the speed of the motors 45 is suitably reduced and applied through the pinions 32 to drive the sprocket wheels 30 of the traction drive.

The motors 45 herein shown are air motors of the rotary type, and are supplied with motive fluid (compressed air) through supply pipes 60 which lead to valves 61 that control the supply of the motive fluid to said motors. Said valves control the supply of motive fluid to the motors for controlling the speed of the motors, and are also reversing valves. The shafts 62 of said valves 61 carry pinions 63 which mesh with gear wheels 64 that are connected to a valve control mechanism for controlling the supply of motive fluid to the motors and for reversing the motors. The said gear wheels 64 are fixed to shafts 65, 65 that are rotatively mounted in bearings 66 which are supported from short channel bars 67 that extend rearwardly from and are supported on the cross beam 37. Said shafts 65 are provided at their adjacent ends with crank arms 70. To one of said crank arms is loosely connected a vertical reciprocating bar 71 and to the other shaft is connected a reciprocating bar 72 that is tubular and incloses the bar 71. The bar 72 extends through and has bearing in the hollow stud axis 18 for the turntable, and the upper ends of both bars 71, 72 are exposed above said turntable. The bar 71 is provided at its upper end with an arm 75 which is fixed to a transverse rock shaft 76 mounted in suitable bearings 77 supported on the turntable and provided at its end with hand levers 78, one at each side of the machine frame. The tubular bar 72 is likewise provided at its upper end with an arm 79 to which is connected a transverse rock shaft 80 that is provided at its ends, one at each side of the machine, with hand levers 81. The rock shafts 76 and 80 are thus provided at both ends with hand levers in order that the motor valves may be controlled from either side of the machine. By rocking either of said shafts in one direction, the corresponding rod (71—72) is depressed or elevated, depending on the direction of rocking motion so as to thereby control the motor valves.

The motor valves thus controlled may be adjusted for supplying more or less of the motive fluid to the motors or for reversing the motors. The adjustment of the motor valves by the mechanism or gear described permits both of the motors to be operated in the same direction, either forward or reverse, to drive the machine forwardly or rearwardly; or permits one of said valves to be operated to rotate its associated motor in one direction while the other motor is rotated in the other direction to turn the machine on an axis between the sides of the machine; or to rotate one motor while the other is stationary to turn the machine on the axis adjacent to one side of the machine. The speeds of the motors may be intermediately adjusted to secure differential actions of the motors on the traction belts for purposes of more delicately steering or directing the machine.

I claim as my invention,—

1. A creeping tractor drive comprising a rigid frame embracing a horizontal bed plate and turntable mounted thereon, front and rear pairs of toothed wheels mounted in the frame, endless creeping traction belts mounted on and driven by said wheels, power means carried by the frame and connected to the said toothed wheels to drive the same and the endless traction belts, valve mechanisms associated with said power means and a valve gear having parts co-axial with the rotative axis of the turntable on the bed plate, with means above the turntable for operating the valve gear.

2. A creeping traction drive, comprising a frame, consisting of two series of side beams and transverse cross beams with a bed plate mounted on and supported by said beams, stub shafts rotatively mounted in the side beams at the front and rear ends of the frame, toothed wheels on said shafts, endless creeping traction belts mounted on and driven by said wheels, smaller driving gears meshing with the toothed wheels, a divided shaft on which said gears are mounted, sprocket wheels carried by said divided shafts, a second shaft, sprocket wheels rotatably mounted on said second shaft, and a driving belt from sprockets on said second shaft to power shafts, power shafts, and motors driving said power shafts, substantially as set forth.

3. A creeping tractor drive comprising a frame, front and rear wheels, endless creeping traction belts mounted on and driven by said wheels, a divided shaft mounted in bearings at one end of the frame and provided with pinions meshing with the wheels at the corresponding end of the frame, a solid shaft extending across and mounted in the frame adjacent to the divided shaft, two motors having separate shafts mounted in the frame, a plurality of sprocket wheels carried on sleeves rotatively mounted on the solid shaft, driving connections between said power shafts and said sprockets, and other drive connections between sprockets on said solid shaft and the sections of the divided shaft, substantially as shown.

In testimony whereof I claim the foregoing as my invention, I hereunto append my signature at Chicago, Illinois, this 16th day of March, 1918.

GEORGE W. JACKSON.